United States Patent
Kilroy

(10) Patent No.: US 8,922,961 B2
(45) Date of Patent: Dec. 30, 2014

(54) TWO-LEVEL LIGHTNING PROTECTION CIRCUIT

(75) Inventor: Donald G. Kilroy, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 38 days.

(21) Appl. No.: 12/566,760

(22) Filed: Sep. 25, 2009

(65) Prior Publication Data

US 2011/0075305 A1  Mar. 31, 2011

(51) Int. Cl.
*H02H 3/20* (2006.01)
*H02H 3/22* (2006.01)

(52) U.S. Cl.
CPC ................................. *H02H 3/22* (2013.01)
USPC .............................. 361/56; 361/111; 361/118

(58) Field of Classification Search
USPC ............................................. 361/56, 111, 118
See application file for complete search history.

(56) References Cited

U.S. PATENT DOCUMENTS

| | | | | |
|---|---|---|---|---|
| 4,293,756 A * | 10/1981 | Hoyt et al. | | 219/133 |
| 4,760,493 A | 7/1988 | Pearson | | |
| 4,999,523 A * | 3/1991 | Cham et al. | | 327/433 |
| 5,159,518 A * | 10/1992 | Roy | | 361/56 |
| 5,175,665 A | 12/1992 | Pegg | | |
| 5,313,116 A * | 5/1994 | Murabayashi et al. | | 326/109 |
| 5,365,099 A * | 11/1994 | Phipps et al. | | 257/328 |
| 5,426,377 A * | 6/1995 | Kimura | | 326/33 |
| 5,585,991 A * | 12/1996 | Williams | | 361/30 |
| 5,805,394 A | 9/1998 | Glennon | | |
| 5,930,096 A * | 7/1999 | Kim | | 358/1.15 |
| 5,973,359 A * | 10/1999 | Kobayashi et al. | | 257/328 |
| 6,385,028 B1 * | 5/2002 | Kouno | | 361/111 |
| 6,411,133 B1 * | 6/2002 | Matsudai et al. | | 327/65 |
| 6,538,866 B1 * | 3/2003 | Hanzawa et al. | | 361/91.1 |
| 6,621,907 B1 * | 9/2003 | Smith | | 381/94.5 |
| 6,700,765 B2 * | 3/2004 | Ely | | 361/91.1 |
| 6,738,245 B2 * | 5/2004 | Ely | | 361/91.1 |
| 7,050,286 B2 | 5/2006 | Pridham et al. | | |
| 7,113,412 B2 * | 9/2006 | Shao et al. | | 363/18 |
| 7,277,266 B1 | 10/2007 | Le et al. | | |
| 7,292,011 B2 | 11/2007 | Beneditz | | |
| 7,456,611 B2 * | 11/2008 | Mullett et al. | | 320/130 |
| 7,518,838 B1 | 4/2009 | Oldenburg et al. | | |
| 7,554,785 B2 | 6/2009 | Hawley | | |
| 7,558,036 B2 * | 7/2009 | Wardzala | | 361/91.1 |
| 7,561,402 B2 | 7/2009 | Heeter | | |
| 8,610,485 B2 * | 12/2013 | Hiyama | | 327/324 |
| 2008/0019070 A1 | 1/2008 | Kilroy et al. | | |
| 2008/0144241 A1 | 6/2008 | Crawley et al. | | |

OTHER PUBLICATIONS

European Search Report dated Nov. 7, 2012 for European Patent Application No. 10251655.6.

* cited by examiner

*Primary Examiner* — Rexford Barnie
*Assistant Examiner* — Zeev V Kitov
(74) *Attorney, Agent, or Firm* — Carlson, Gaskey & Olds, P.C.

(57) ABSTRACT

A lightning protection circuit includes a transistor array, a transistor array gate drive, and a second stage protection element which forces a voltage at the gate node of the transistor array to be higher than the voltage at the source node of the transistor array when a threshold is exceeded.

17 Claims, 2 Drawing Sheets

TWO-LEVEL LIGHTNING PROTECTION CIRCUIT

BACKGROUND

This disclosure is directed to a lightning protection circuit, and more specifically to a lightning protection circuit capable of handling a two level lightning strike.

Modern airplanes typically include a power generation system that generates power from turbine rotation, and distributes the generated power to onboard electronics. When an airplane is struck by lightning, at least a portion of the energy from the lightning strike is transmitted through the power distribution system and is dissipated in the onboard electronics if no protection system is employed. The dissipation can damage the electronics or reduce functionality. Lightning protection circuits may be used for protecting onboard electronics from a lightning strike.

SUMMARY

A disclosed lightning protection circuit includes a transistor or transistor array with a drain node, a gate node, and a source node. A transistor gate drive switches the transistor into linear operation during a high voltage spike. A second protection element is capable of forcing a voltage at the drain node to apply a voltage at the gate node when the voltage spike exceeds a threshold.

Additionally disclosed is a method for protecting electronics from a high voltage spike. The method initially allows current to pass through a transistor network. When a voltage spike is detected, the transistor network transitions to linear operation. If the voltage is above a first threshold and below a second threshold, the transistor source voltage is limited to a voltage near the first threshold. If the voltage is above a second threshold, the transistor drain voltage is limited to a voltage near the second threshold.

These and other features of the present invention can be best understood from the following specification and drawings, the following of which is a brief description.

DETAILED DESCRIPTION OF THE PREFERRED EMBODIMENT

Traditionally aircraft bodies have been partially constructed of aluminum, or other similar materials. This construction aids in lightning protection by distributing lightning energy through the body of the plane and by reducing magnetic field coupling to wires, thereby reducing the voltage level which would otherwise threaten the electronic devices onboard the plane. Recent innovations in airplane design have lead to the replacement of the aluminum construction with a lighter and stronger construction using composite materials.

As a result of the switch to composite material construction, lightning strike requirements have changed to include both a high voltage and high current event and a new very high voltage and low current lightning strike event. The first lightning strike requirement is similar in scope to the lightning strike requirements of a traditional airplane, having a high voltage spike accompanied by a high current spike. The new lightning requirement, however, has an even higher voltage spike accompanied by a relatively low current spike. For example, the first requirement could be 500 Volts and 500 Amps, whereas the second requirement could be 1500 Volts and 15 Amps. The values above are listed for explanation purposes only. When electronic circuitry must accommodate both lightning threat levels, known lightning protection circuits are inadequate and can break down, resulting in the unwanted exposure of the protected electronics.

When a lightning strike occurs, a high voltage accompanied by a high current can be transmitted through the electrical system. Traditionally protection circuits have protected against lightning strikes by either shunting the high current from reaching the unprotected circuits or blocking the high voltage from reaching the unprotected circuits. For the traditional protection circuits that blocks the high voltage against lightning strikes a transistor array between the lighting threat and the protected electronics is used. The protection circuit increases impedance or opens the transistor array during the lightning strike, thereby preventing excess voltage or current from passing through, and closes the transistor array once the lightning strike has passed. During the lightning strike, protected electronics can receive power from an alternate power source, such as a capacitor, if necessary. If a protection system designed for use with a high voltage/high current lightning strike is exposed to a very high voltage/low current lightning strike, protection elements can burn out and become inoperable which can result in damage to the unprotected electrical system.

Figure 1:
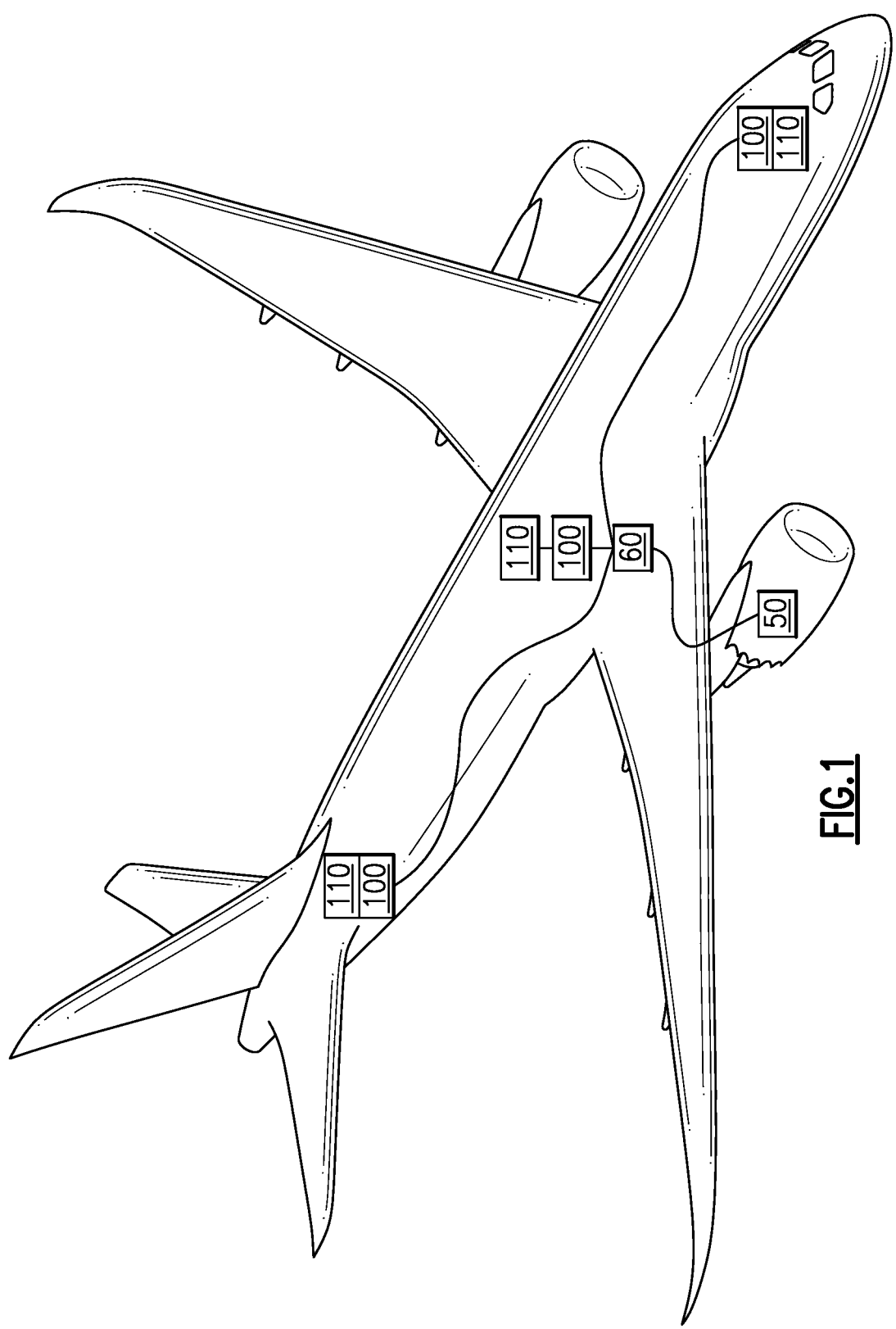
FIG. 1 illustrates an aircraft with an onboard power generation system and a lightning protection circuit.

FIG. 1 schematically illustrates an aircraft, in this case an airplane, constructed out of modern composite materials having a power generator 50 which provides power to a central power distributor 60. The power from the distributor 60 is passed through a protection circuit 100 prior to reaching the protected electronics 110, which may be located throughout the airplane. Alternately, each of the protected electronics 110 can have a corresponding, dedicated protection circuit rather than utilizing a centralized protection circuit 100.

Figure 2:
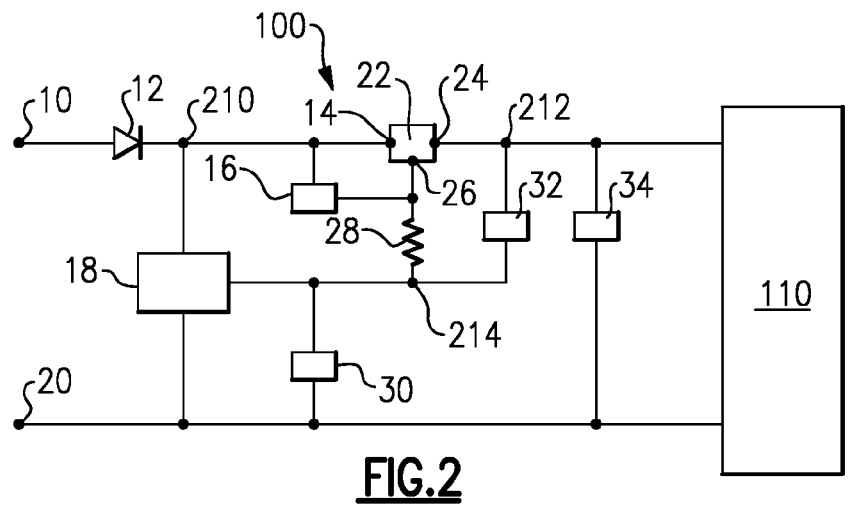
FIG. 2 schematically illustrates an example lightning protection circuit for an aircraft capable of handling a high voltage/high current or a very high voltage/low current lightning strike.

FIG. 2 schematically illustrates a lightning protection circuit 100 which is capable of protecting electronics from two different types of lightning strikes. One lightning strike may be a high voltage/high current spike. A different type lightning strike may be a very high voltage/low current spike. The lightning protection circuit of FIG. 2 has an input 10, which is connected to a diode 12. The diode 12 is connected to a drain node 14 of a transistor array 22, a second stage protection element 16, and a gate drive 18. The gate drive 18 is connected to an electrical return 20. The transistor array 22 has a drain node 14, a source node 24, and a gate node 26. The transistor array gate node 26 has a series connected resistor, which is connected to an end of a resistor 28. The resistor 28 is connected at its other end to the gate drive 18, a voltage regulation component 30, and a transistor gate voltage clamp 32. An alternate power source 34 is connected to the transistor array source 24 and to the electrical return 20. Connected in parallel to the alternate power source 34 is at least one protected electronic component 110.

The lightning protection circuit 100 of FIG. 2 protects the electronic component 110 during a lightning strike by either disconnecting the input 10 from the electronic component 110 and providing power to the electronic component 110 from the alternate power source 34 or transitioning the transistor array 22 into a linear operation mode. During a very high voltage lightning strike the protection circuit 100 connects the input 10 to the electronic component 110 by transitioning the transistor array 22 into a linear operation mode, dissipates a portion of the lightning energy, and allows a portion of the current to pass through the alternate power source 34 relatively unimpeded to maintain a safe voltage to electronic component 110.

In the absence of a lightning strike, the lightning protection circuit 100 operates under a normal condition. Under normal conditions, the gate drive 18 provides a voltage to the transistor array gate node 26. This voltage maintains the transistor array 22 in a closed state (a connected circuit between the drain node 14 and the source node 24), which allows power from the input 10 to flow through the transistor array 22. The voltage clamping device 32 clamps the voltage at the transistor gate 26 to source 24, thereby preventing the gate node's 26 voltage from exceeding a preset magnitude and protecting the transistor array 22. As the voltage at the input 10 increases, the clamping device 30 clamps the output voltage of the gate drive 18 at a set value, thereby ensuring that the voltage at the transistor gate node 26 and source node 24 does not exceed a preset voltage. This configuration protects the electronics 110 from normal fluctuations and minor power spikes within the electrical system.

When a lightning strike occurs, the power on the input line can rapidly transition to a high voltage/high current power input. If no changes occur within the protection circuit 100 when a spike of this type occurs, the power will be transmitted through the transistor array 22 and into the protected electronics 110 where it will be dissipated due to the combination of a high current and a high voltage. High levels of power dissipation within the protected electronics 110 are undesirable.

In order to prevent the high voltage/high current spike from traveling through the protected electronics 110, the gate drive voltage output is clamped by a voltage regulation component 30. During a high voltage/high current lightning strike, the voltage at the transistor array source 24 will increase until the transistor array 22 begins to turn off due to reduced gate to source 24 voltage. Since the transistor array gate 26 voltage is clamped, the transistor array 22 is forced into linear operation (high resistive connected circuit exists between drain node 14 and source node 24) and the electrical power from the lightning strike is dissipated within the transistor array 22. The high voltage/high current spike is then absorbed in the transistor array 22 which is undamaged.

While the transistor array 22 is capable of dissipating the power from a high voltage/high current lightning strike, it is not capable of withstanding an extremely high voltage present in the second type of lightning strike without becoming damaged. Since the second type of the lightning strike has a low current, the level of power dissipation in the protected electronics is minimal if the lightning energy is allowed to pass through to alternate power source 34 and the protected electronics 110, and the protected electronics 110 would not be damaged.

To prevent damage to the transistor array 22 during an extremely high voltage/low current strike, the second stage protection element 16 closes the transistor array 22 when the lightning strike moves into a range beyond the drain to source rating of the transistor array 22, thereby allowing the excess voltage spike to pass through the transistor array 22 with a nominal amount of power dissipation. The second stage protection is triggered when the voltage spike exceeds a first and second threshold. The second threshold is approximately equal to a breakdown voltage of the second stage protection element 16. The second stage protection element 16 functions using a breakdown voltage of the protection element 16. The protection element 16 prevents any power from passing through itself as long as the breakdown voltage is not exceeded. When the breakdown voltage is exceeded, the protection element 16 allows power to pass through, and transmits the voltage to the transistor array gate node 26. The voltage provided to the transistor array gate node 26 clamps the transistor array 22 to safe operation, and allows the excess voltage spike to pass through the transistor array 22. Once the transistor array 22 is clamped, and the voltage spike passes through the transistor array 22, and the second stage protection element 16 allows enough voltage from the voltage spike to reach the gate node 26 and maintain the transistor array in the closed state, but allows the remainder of the voltage to follow the same path as it would follow under normal conditions.

Figure 3:
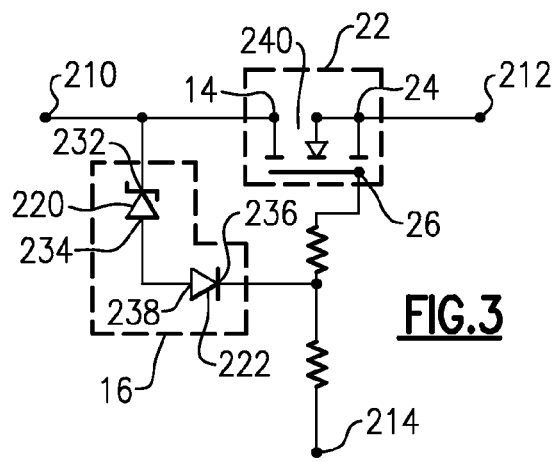
FIG. 3 illustrates a portion of the example lightning protection circuit of FIG. 2.

FIG. 3 illustrates features of the portion of a protection circuit of FIG. 2 between nodes 210, 212, and 214. The illustrated portion includes the transistor array 22 and the second stage protection circuit 16. The second stage protection circuit 16 has at least two components. The first component is a Zener diode 220, and the second component is a standard diode 222. The Zener diode 220 blocks current and voltage from being transmitted from a cathode 232 to an anode 234 unless the voltage exceeds the breakdown voltage of the Zener diode 220 and allows voltage to pass from the anode 234 to the cathode 232. The breakdown voltage of the Zener diode 220 depends on the construction, and can be selected to match a voltage at which the lightning strike would transition from the first stage to the second stage. Additional components can be added to achieve specific voltage values according to known principles.

The standard diode 222 allows power to travel from an anode 238 to a cathode 236 while preventing power flow in the reverse direction. Since the Zener diode 220 and the standard diode 222 are electrically connected via their anodes 234, 238, power is prevented from being transmitted across the second stage protection device entirely unless the breakdown voltage of the Zener diode 220 is exceeded.

While the example of FIG. 3 illustrates a single Zener diode 220, a single standard diode 238, and a single transistor 240, these components may be functionally replaced by other types of components, and methods for performing this replacement are known.

Figure 4:
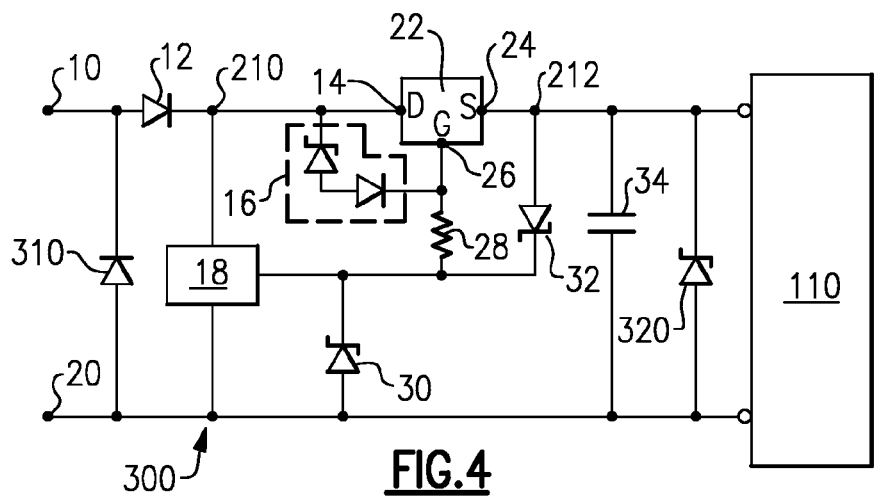

The example of FIG. 4 illustrates a similar two level protection circuit 300 to the protection circuit 100 illustrated in FIG. 2, with like numerals indicating like elements. The example of FIG. 4 also includes additional optional protection elements 310, 320, which can further protect the electronics 110. The first optional protection element is a standard diode 310. The standard diode 310 further protects the electronics 110 when a lightning strike occurs and causes a negative voltage and current spike instead of a positive voltage and current spike. If a negative voltage lightning strike occurs, the standard diode 310 will cause the voltage spike to travel through this protection element prior to reaching the protected electronics 110 rather than traveling in the reverse direction because the standard diode 310 allows power flow from the input return 20 to the input 10, however the standard diode 310 prevents power from flowing directly from the input 10 to the input return 20 under other circumstances due to the standard diodes unidirectional powerflow. Standard diode 310 is added when the voltage rating of diode 12 can not block a negative voltage lightning strike. Alternately, the depicted standard diode 310 could be replaced with a functionally equivalent diode array and achieve the same purpose.

The second optional protection element may be a Zener diode 320. The Zener diode 320 further clamps the voltage of the protected electronics 110 by allowing power to pass to the input return 20 whenever the voltage rating of the Zener diode 320 is exceeded. This forces the voltage across the protected electronics 110 to always be less than or equal to the breakdown voltage of the Zener diode 320, because any higher voltages will travel through the Zener diode 320 and bypass the protected electronics. Alternately, the depicted Zener diode 320 could be replaced with a functionally equivalent diode array or transzorb and achieve the same purpose. While FIG. 4 illustrates an example having both of the described optional elements 310, 320, a system can be designed and constructed according to the above description using either of the optional elements alone, or using both.

While the above description has described a protection circuit where the transistor array 22 operates in a linear mode during the first type of lightning strike, an alternate configuration could be used where the transistor array 22 is placed in an open mode, thereby preventing power from passing through it entirely. When the transistor array 22 is in an open mode, the alternate power source 34 temporarily provides power to the protected electronics 110, thereby preventing operation of the protected electronics 110 from being interrupted during the lightning strike.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A lightning protection circuit comprising;
   a transistor array having a drain node, a gate node, and a source node;
   a transistor array gate drive capable of switching said transistor array into a second mode during a high voltage spike;
   a second stage protection element connecting said drain node to said gate node operable to force a voltage at said gate node to be higher than a voltage at said source node when a voltage level across said second stage protection element exceeds the threshold;
   a voltage regulation component operable to passively ensure a voltage at said source node does not exceed a preset magnitude; and
   a voltage clamp directly connecting an output of said gate drive to a voltage return, said voltage clamp capable of shunting any output voltage of said gate drive in excess of a breakdown voltage directly to said voltage return.

2. The lightning protection circuit of claim 1, wherein said second mode is a linear operation mode.

3. The lightning protection circuit of claim 1, further comprising a protected electrical component connected to said transistor array at an input of said protected electrical component and connected to a voltage return at an output of said electrical component.

4. The lightning protection circuit of claim 1, wherein said second stage protection element comprises a Zener diode array configured to allow a portion of a voltage to reach said gate node when said voltage exceeds a breakdown voltage of said Zener diode array.

5. The lightning protection circuit of claim 1, further comprising an alternate power source capable of providing power to a protected component when said transistor array is open.

6. The lightning protection circuit of claim 1, further comprising a standard diode array connecting a voltage input and a voltage return such that power may travel directly from said return to said input and power is prevented from traveling directly from said input to said return.

7. The lightning protection circuit of claim 1, further comprising a Zener diode array connecting a protected electrical component's input and a protected electrical component's return such that any voltage in excess of a breakdown voltage of said Zener diode is directed through said Zener diode to a voltage return.

8. The lightning protection circuit of claim 1, further comprising a diode array connecting a voltage input and said drain node of said transistor network, thereby preventing a backflow of electrical current.

9. A method for protecting electronic equipment from high voltage spikes comprising the steps of;
   passing a voltage through a transistor network when an input voltage is lower than a first threshold value;
   placing said transistor network in a protection mode when the input voltage exceeds the first threshold value but is under a second threshold value;
   passing a portion of said voltage through a second stage protection element connecting a drain node of said transistor network to a gate node of said transistor network when said input voltage exceeds the first threshold value and exceeds the second threshold value;
   allowing said voltage to pass through protected equipment when said voltage exceeds said second threshold value;
   returning said voltage through a circuit return when said voltage exceeds said second threshold value; and
   clamping an output voltage of a transistor network gate drive using a voltage clamp directly connecting the output voltage of the gate drive to a voltage return when the output voltage exceeds a clamp voltage.

10. The method for protecting electronic equipment from high voltage spikes of claim 9, wherein the step of placing said transistor network in a protection mode comprises placing said transistor array in a linear operation mode and thereby dissipating at least a portion of the voltage spike within the transistor array.

11. The method for protecting electronic equipment from high voltage spikes of claim 9, wherein the step of passing a voltage through said transistor network when said input voltage exceeds the first threshold and exceeds the second threshold comprises using at a least a portion of said voltage to clamp said transistor network, thereby allowing a remainder of said voltage to traverse said transistor network substantially unimpeded.

12. The lightning protection circuit of claim 1, wherein said voltage clamp directly connecting said output of said gate drive to said voltage return is characterized by a lack of other electrical components connecting said output of said gate drive to said voltage return.

13. The method for protecting electronic equipment from high voltage spikes of claim 9, wherein said step of clamping said output voltage of said transistor network gate drive using said voltage clamp directly connecting the output voltage of the gate drive to the voltage return when the output voltage exceeds a clamp voltage is characterized by not passing the output voltage of the gate drive through non-clamp components prior to said return.

14. The lightning protection circuit of claim 1, wherein said transistor array comprises a Field Effect Transistor.

15. The lightning protection circuit of claim 14, wherein each transistor in said transistor array is a Field Effect Transistor.

16. The method of claim 9, wherein said transistor network comprises a Field Effect transistor.

17. The method of claim 16, wherein each transistor in said transistor network is a Field Effect Transistor.

\* \* \* \* \*